United States Patent [19]

Byrne

[11] Patent Number: 5,041,296

[45] Date of Patent: * Aug. 20, 1991

[54] PROCESS FOR MICROWAVE CHOCOLATE FLAVOR FORMULATION, PRODUCT PRODUCED THEREBY AND USES THEREOF IN AUGMENTING OR ENHANCING THE FLAVOR OF FOODSTUFFS, BEVERAGES AND CHEWING GUMS

[75] Inventor: Brian Byrne, East Brunswick, N.J.

[73] Assignee: International Flavors & Fragrances Inc., New York, N.Y.

[*] Notice: The portion of the term of this patent subsequent to Jul. 10, 2007 has been disclaimed.

[21] Appl. No.: 648,916

[22] Filed: Feb. 1, 1991

Related U.S. Application Data

[63] Continuation-in-part of Ser. No. 514,248, Apr. 25, 1990, abandoned, which is a continuation-in-part of Ser. No. 371,635, Jun. 26, 1989, Pat. No. 4,940,592.

[51] Int. Cl.[5] .............................................. A21D 6/00
[52] U.S. Cl. ..................................... 426/241; 426/94; 426/243; 426/533; 426/549
[58] Field of Search ................. 426/241, 242, 243, 94, 426/549, 533

[56] References Cited

U.S. PATENT DOCUMENTS

| | | | |
|---|---|---|---|
| 2,835,590 | 5/1958 | Rusoff | 426/533 |
| 2,835,592 | 5/1958 | Rusoff | 426/533 |
| 4,232,832 | 2/1981 | Moody | 426/241 |
| 4,396,635 | 8/1983 | Roudebush et al. | 426/243 |
| 4,448,791 | 5/1984 | Fulde et al. | 426/94 |
| 4,518,618 | 5/1985 | Hsia et al. | 426/262 |
| 4,735,812 | 4/1988 | Bryson et al. | 426/262 |
| 4,740,376 | 4/1988 | Yang | 426/5 |
| 4,804,548 | 2/1989 | Sharma et al. | 426/96 |
| 4,882,184 | 11/1989 | Buckholz et al. | 426/243 |
| 4,940,592 | 7/1990 | Byrne et al. | 426/241 |

FOREIGN PATENT DOCUMENTS 0203725 12/1986 European Pat. Off. .

OTHER PUBLICATIONS

Fennema, O. R., Food Chemistry, 1985, p. 619, Marcel Dekker, Inc., New York.
Copson, et al., "Browning Methods in Microwave Cooking", Food Chemistry, vol. No. 5, May 1955, pp. 424–427.

Primary Examiner—Marianne Cintins
Assistant Examiner—Leslie Wood
Attorney, Agent, or Firm—Arthur L. Liberman

[57] ABSTRACT

Described is a process for carrying out microwave production of a chocolate flavoring product, the product produced thereby and foodstuffs, beverages and chewing gums containing said product. The process comprises the steps of:

(a) providing a composition of matter consisting essentially of precursors of a chocolate flavor (e.g., sugar, leucine and phenyl alanine) and a solvent capable of raising the dielectric constant of the reaction mass to be heated;

(b) exposing the mixture of reaction precursors to microwave radiation for a period of time so that the resulting product is caused to have a chocolate flavor;

(c) providing a foodstuff, chewing gum or beverage base;

(d) admixing the chocolate flavor reaction product of (b) with the foodstuff, beverage or chewing gum base.

5 Claims, 5 Drawing Sheets

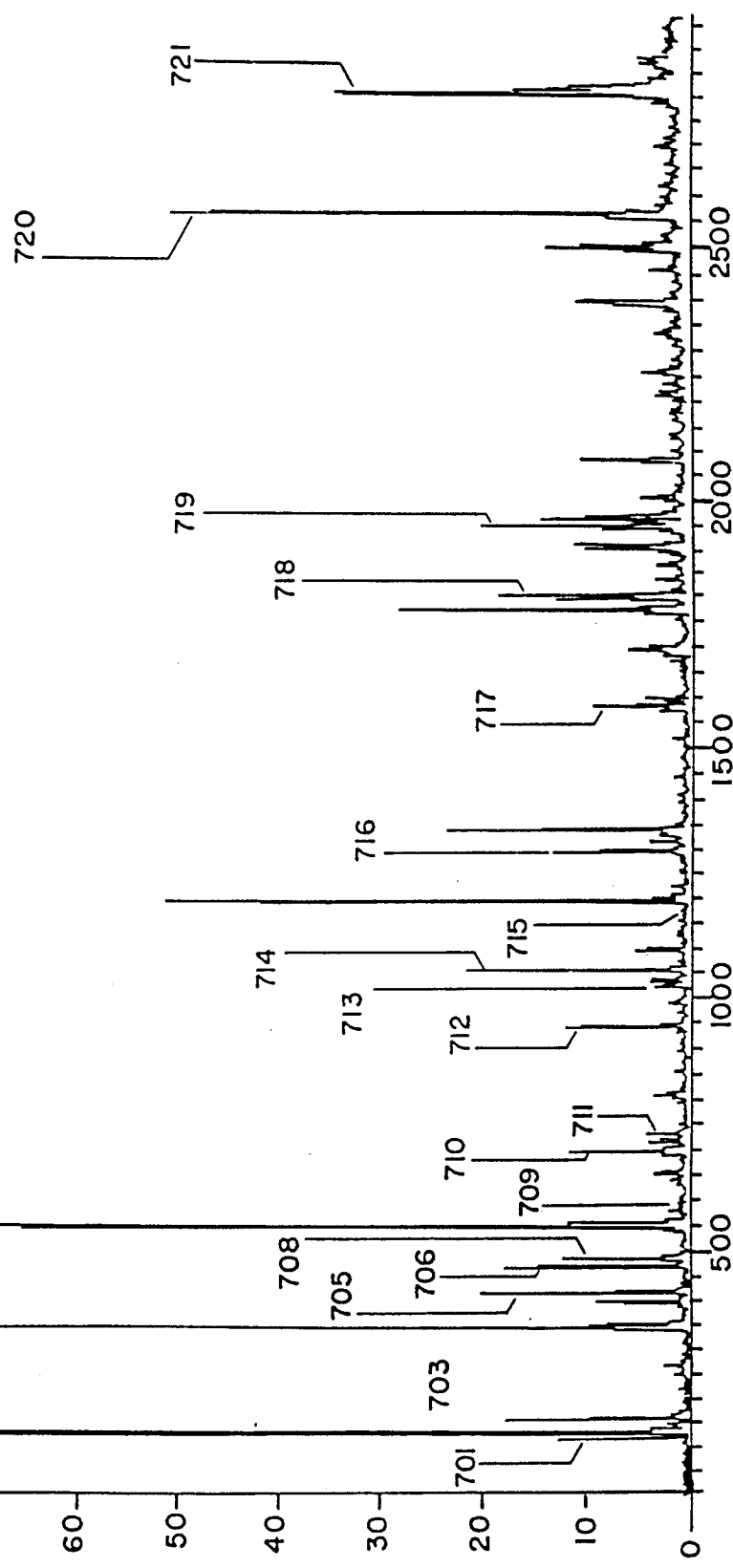

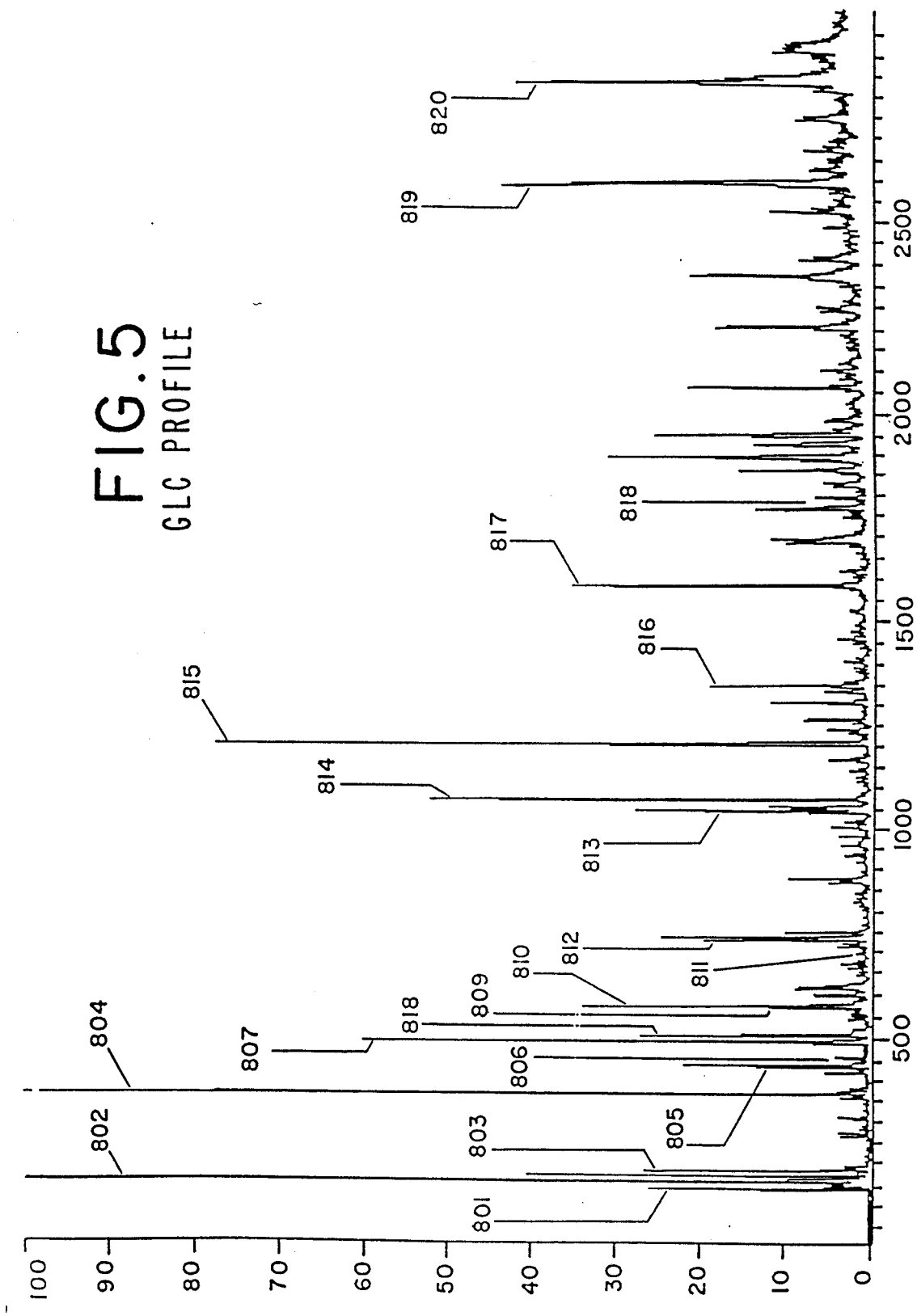

PROCESS FOR MICROWAVE CHOCOLATE FLAVOR FORMULATION, PRODUCT PRODUCED THEREBY AND USES THEREOF IN AUGMENTING OR ENHANCING THE FLAVOR OF FOODSTUFFS, BEVERAGES AND CHEWING GUMS

This application is a continuation-in-part of application for U.S. Letters Patent, Ser. No. 514,248 filed on Apr. 25, 1990, now abandoned, which, in turn, is a continuation-in-part of application for U.S. Letters Patent, Ser. No. 371,635 filed on June 26, 1989, now U.S. Pat. No. 4,940,592 issued on July 10, 1990.

BACKGROUND OF THE INVENTION

The increased use of microwaves for cooking has given rise to a large market in microwavable foods. While the advantage of microwave cooking over convection oven cooking is the time savings, the disadvantage heretofore has been that flavored goods do not develop the flavoring expected with convection oven cooking.

Heretofore, when using microwave ovens for cooking foodstuffs containing flavoring and browning additives or flavoring and browning formation additives, the food to be cooked taken in combination with additives therefor did not have the proper time-temperature-heat transfer variable (e.g., heat capacity, thermal conductivity, viscosity and density) combination for the added flavoring composition to effectively impart, augment or enhance flavor to the resulting product, e.g., chewing gum, beverage or foodstuff. Therefore, for a microwave system to work, the physical heat and mass transfer conditions must be such that the added flavor values must not be driven off or destroyed and must be properly imparted to the foodstuff, beverage or chewing gum.

The reaction responsible for chocolate flavor formation during convection oven cooking is the reaction between sugar, leucine and phenyl alanine which results in the creation of various reaction products including aldol condensation products such as COCAL ® (a Registered Trademark of International Flavors & Fragrances Inc.) having the structure:

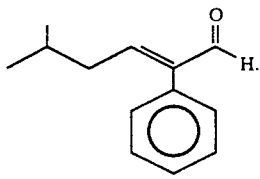

Although the prior art does take advantage of the reaction between reducing sugars and amino acids, it has not made any correlation of reaction rates needed for formation of a substantive strong chocolate flavor with reaction variables such as time, pH, solvent, amino acid reactivity or sugar reactivity.

BRIEF DESCRIPTION OF THE DRAWINGS

FIG. 4 is the GLC profile for the chocolate flavor reaction product (freon extract) produced by means of convection heating (and not by means of microwave radiation) according to Example V.

FIG. 5 is the GLC profile for the reaction product of Example V produced by means of microwave radiation.

SUMMARY OF THE INVENTION

Figure 1:
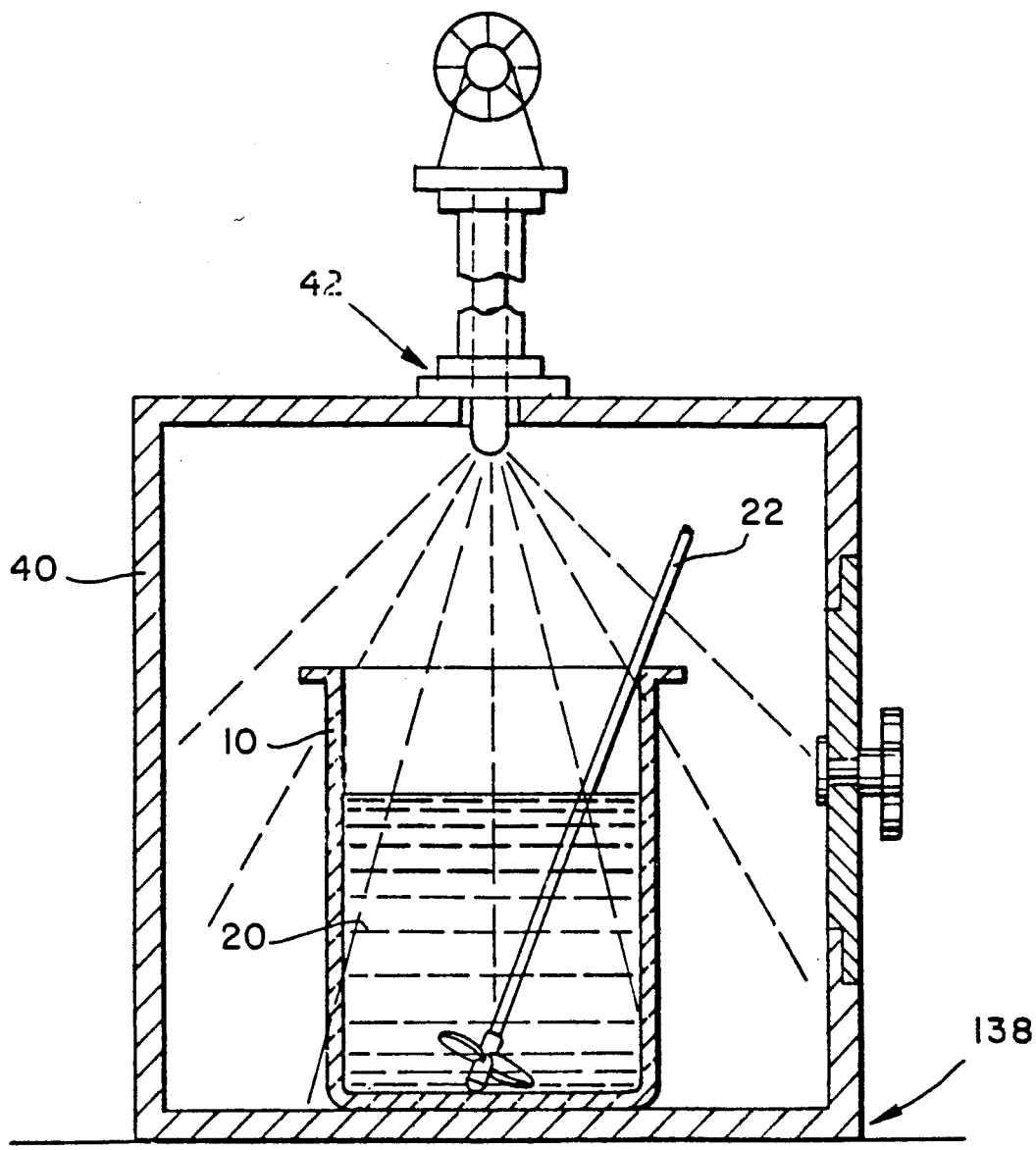
FIG. 1 is a cut-away side elevation view (in schematic form) of a microwave oven containing a reaction vessel prior to and during the carrying out of that part of the process of my invention which involves the formation of the chocolate flavor.

My invention is directed to a process for carrying out microwave production of a chocolate flavoring product, the product produced thereby and foodstuffs, beverages and chewing gums containing said product. The process comprises the steps of:

(a) providing a composition of matter consisting essentially of precursors of a reaction flavor (preferably a chocolate reaction flavor; e.g., a sugar, leucine and phenyl alanine) and a solvent capable of raising the dielectric constant of the reaction mass to be heated via microwave radiation (such as glycerine, propylene glycol, mixtures of glycerine and propylene glycol, mixtures of glycerine and ethanol, and mixtures of propylene glycol and ethanol) and water;

(b) exposing the resulting mixture to microwave radiation for a period of time whereby the resulting product is caused to have a chocolate flavor;

(c) providing a chewing gum base, a beverage base or a foodstuff base (e.g., dough);

(d) admixing the reaction product of (b) with the base of (c); and (e) optionally, reheating the resulting product to form an edible foodstuff.

My invention is also directed to the products produced according to such process.

In carrying out my invention, a chocolate flavor is produced by means of microwave heating of a sugar, leucine and phenyl alanine Such chocolate flavor necessarily contains the compound COCAL ® a Registered Trademark of International Flavors & Fragrances Inc. having the structure:

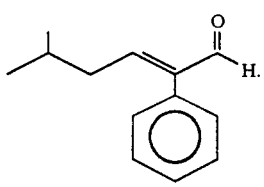

The precursours for producing such a chocolate flavor are phenyl alanine having the structure:

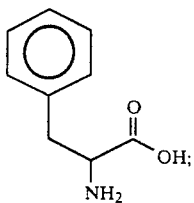

leucine having the structure:

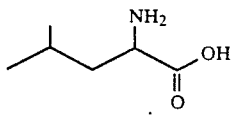

and a sugar shown by the letter:

S

The reaction for forming the chocolate flavor prior to mixing with the beverage chewing gum base or foodstuff base is as follows:

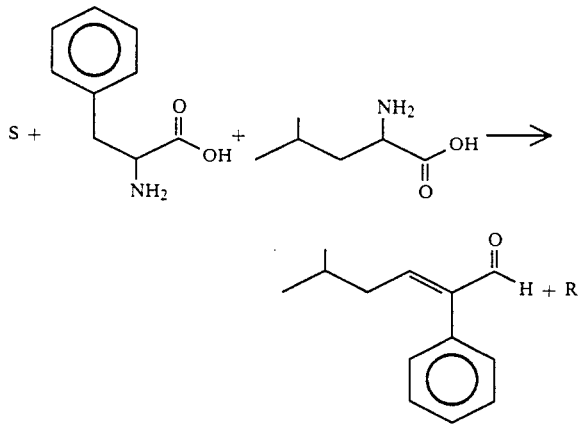

wherein the symbol:

R is indicative of other reaction products being formed in the formation of the chocolate flavor. In causing the process of my invention to be operable, the proper solvent-reactant makeup must be employed. Necessarily, the reaction solvent physical properties are interrelated.

Thus, with respect to the solvents utilizable in the practice of my invention, the solvent system is, in the alternative, as follows:
(i) glycerine;
(ii) propylene glycol;
(iii) mixtures of glycerine and propylene glycol in the ratio of from about one part glycerine:99 parts propylene glycol up to about 99 parts glycerine:1 part propylene glycol;
(iv) mixtures of glycerine and ethanol with the ratio of glycerine:ethanol being from about 99:1 glycerine:ethanol up to about 50:50 ethanol:glycerine; and
(v) mixtures of propylene glycol and ethanol with the ratio of propylene glycol:ethanol being from about 99 parts propylene glycol:1 part ethanol up to about 50 parts propylene glycol:50 parts ethanol.

DETAILED DESCRIPTION OF THE INVENTION

My invention herein has shown that there is a strong relationship between the sugar reactivity and the particular amino acid utilized for production of chocolate flavor.

I have also found that chocolate flavor precursors, that is, phenyl alanine, leucine and a sugar such as ribose, rhamnose or cerelose produce an unexpectedly, advantageously substantive and strong and "natural-like" chocolate flavor.

My invention, carried out at pH's in the range of 9-13 involves amino acid degradation followed by aldol condensation, interalia. Thus, phenyl alanine and leucine are reacted in the presence of a sugar such as ribose, rhamnose and cerelose at a pH in the range of 9-13. The reaction for the purposes of carrying out same uses microwave heating in a specific solvent. The use of microwave heating gives rise to an unexpectedly and advantageously unobvious reaction product; as compared to convection heating as shown in Table III(A) in Example V, infra. An unexpected finding in my invention is that the solvent in which the flavor is formed dramatically affects the rate of reaction. Aprotic solvents, such as triacetin and vegetable oil, are useless in such a reaction system since the reactants are not soluble in the solvent. Polar protic solvents are amongst the solvents in which the reactants are soluble; however, not all members of this solvent class are useful in carrying out the reaction, to wit:

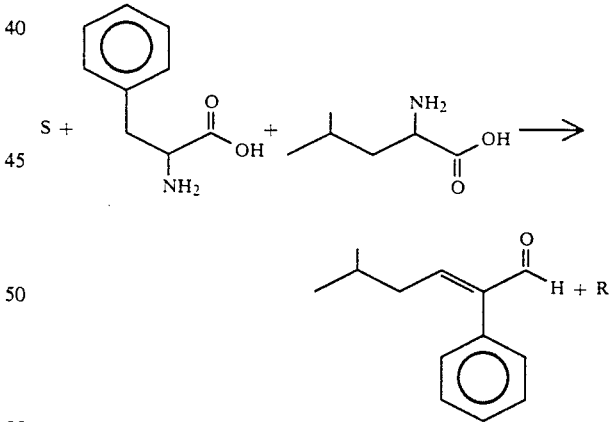

wherein the symbol:

S represents a sugar and the symbol:

R represents other reaction products necessary to create a chocolate flavor.

Both water and ethanol are unacceptable, per se as solvents since the rate of the reaction:

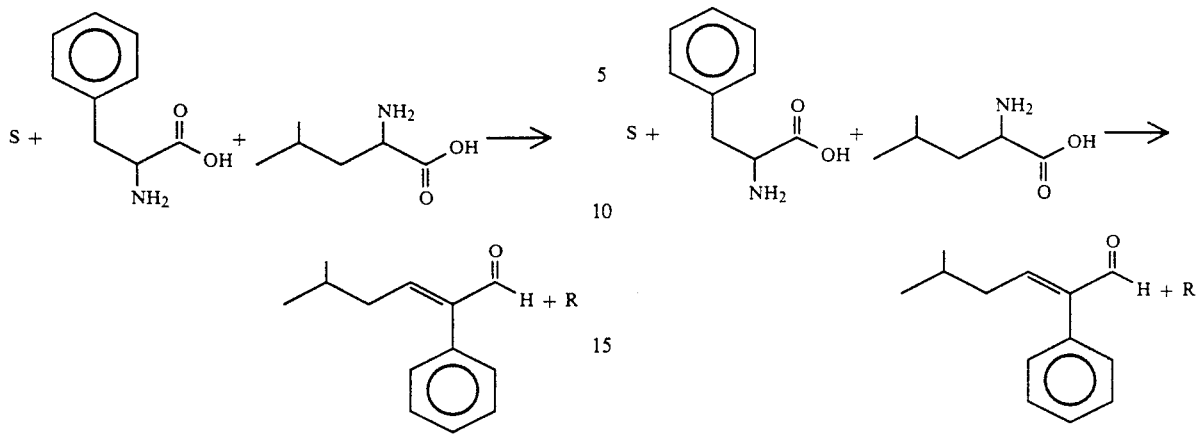

in these solvents is on the order of hours.

In propylene glycol and glycerine the rate of the reaction:

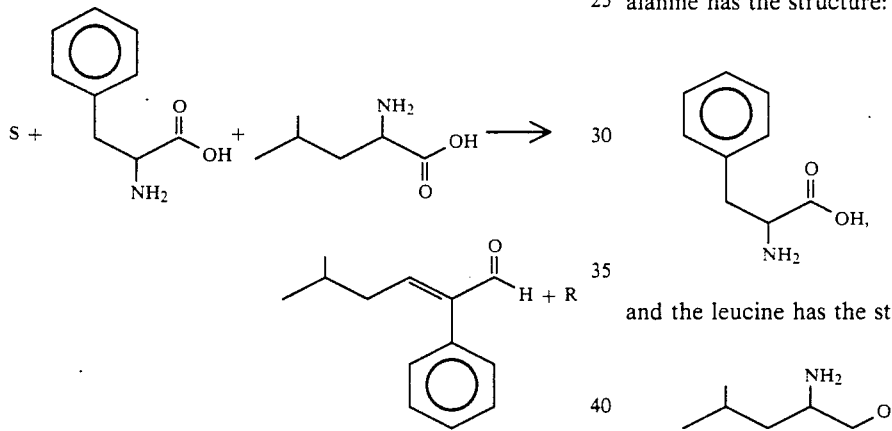

is rapid, achieving the desired chocolate flavor formation in 40 seconds to 2 minutes (120 seconds).

In application for U.S. Letters Patent, Ser. No. 295,450 filed on Jan. 10, 1989 (now U.S. Pat. No. 4,882,184 issued on Nov. 21, 1989) it was shown that the solvent in which the Maillard browning is run dramatically affects the rate of browning. It was also shown there that aprotic solvents, such as triacetin and vegetable oil, were useless in the browning reaction systems since the reactants in the Maillard reaction were not soluble in the solvent. Polar protic solvents were set forth to be amongst the solvents in which the Maillard reactants are soluble; and it was further indicated that not all members of this solvent class are useful for microwave browning. It was further indicated that both water and ethanol, per se, are unacceptable as solvents since the rate of the browning reaction in these solvents is on the order of hours. It was further indicated that in propylene glycol and glycerine the rate of browning is rapid, achieving the desired coloration in 40 seconds to 2 minutes (120 seconds).

With respect to the sugar components of the reactants, whereby the reaction:

The preferred sugars are:
(i) ribose;
(ii) rhamnose; and
(iii) cerelose.

With regard to the amino acid precursors, the phenyl alanine has the structure:

and the leucine has the structure:

The reaction of the amino acids with the sugars, ribose, rhamnose and/or cerelose, for example, the reaction:

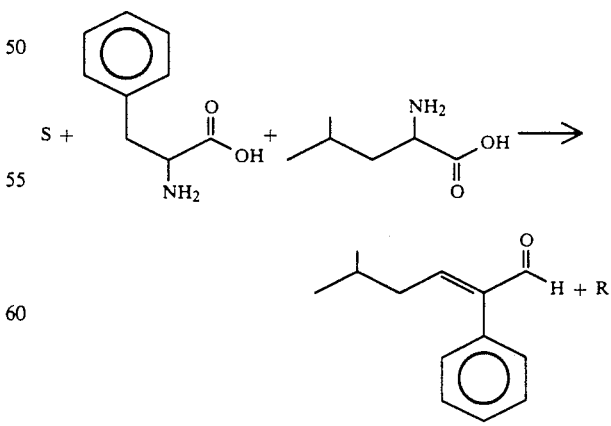

is carried out in a solvent which is capable of raising the dielectric constant of the reaction mass to be heated in a period of time under 120 seconds.

Thus, FIG. 1 is a schematic diagram of a reaction vessel located in a microwave oven during the carrying out of the process of our invention. The reaction mass 20 is contained in microwave oven 138, more specifically, in reaction vessel 10 wherein microwave source 42 emits energy substantially perpendicular to the level of the reaction mass 20 which is stirred using stirring means 22. The microwave energy passes into the reaction mass 20 and causes the reaction to take place, to wit:

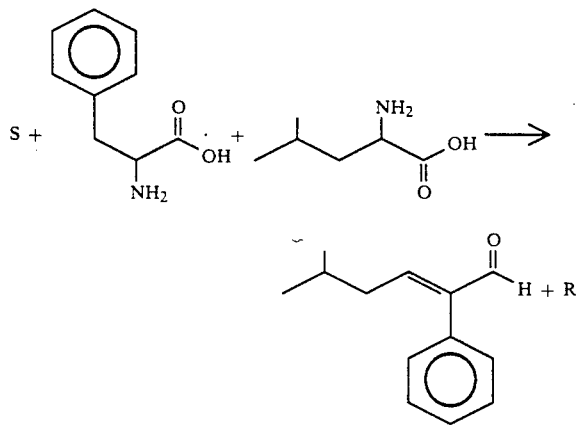

whereby a chocolate flavor is produced which includes the compound having the structure:

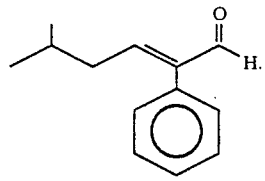

The reaction vessel 10 rests at location 39 in the microwave oven 40.

Another aspect of my invention flavor precurser materials which would include leucine, phenyl alanine and sugar may be reacted in the microwave oven and then the reaction product may be admixed with molten fat and emulsifier. The resulting product may then further be heated to its molten state and mixed with additional flavor materials. Into the mixing operation texturizer may be placed. Drum chilling may result in a product which is useful in the practice of my invention. Spray chilling of the resulting mixed texturized product causes the spray chilled flavor product to be available for use as a flavorant.

Examples of fatty materials useful in this aspect of the process of my invention are set forth, supra, and their respective melting points are as follows:

TABLE I

| Fatty Material | Melting Point Range |
| --- | --- |
| Partially hydrogenated cotton seed oil | 141–147° F. |
| Partially hydrogenated soybean oil | 152–158° F. |
| Partially hydrogenated palm oil | 136–144° F. |
| Mono and diglycerides | 136–156° F. |
| Glycerol monostearate | 158° F. |
| Glycerol monopalmitate | 132° F. |
| Propylene glycol monostearate | 136° F. |

TABLE I-continued

| Fatty Material | Melting Point Range |
| --- | --- |
| Polyglycerol stearate | 127–135° F. |
| Polyoxyethylene sorbitol beeswax derivatives | 145–154° F. |
| Polyoxyethylene sorbitan esters of fatty acids | 140–144° F. |
| Sorbitan monostearate | 121–127° F. |
| Polyglycerol esters of fatty acids | 135–138° F. |
| Beeswax | 143–150° F. |
| Carnauba wax | 180–186° F. |

Figure 2:
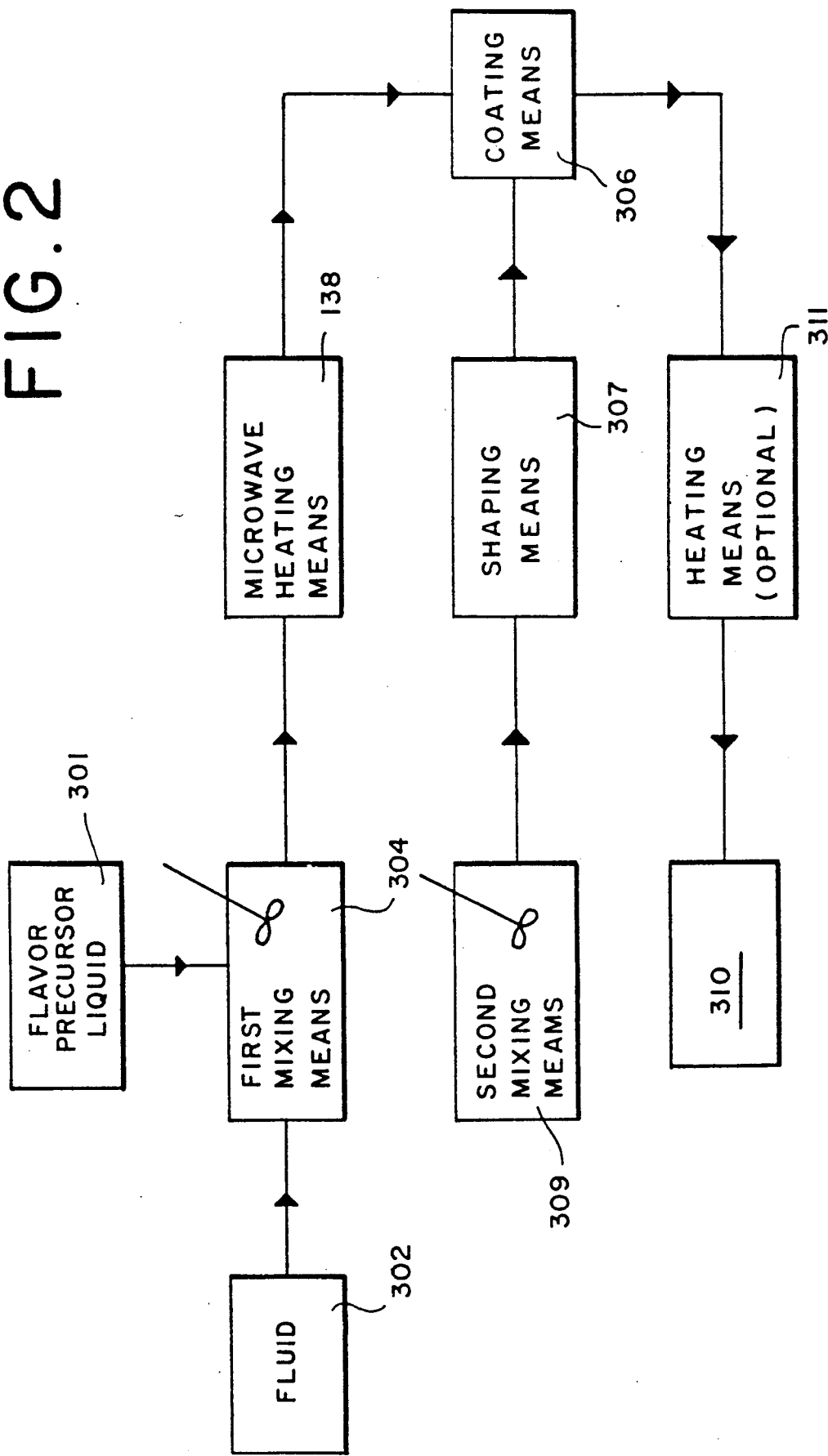
FIG. 2 is a block flow diagram showing the steps, in schematic form, for carrying out that aspect of the process of my invention for forming flavored foodstuffs and indicating the multiple means (apparatus elements) useful in carrying out that aspect of the process of my invention for forming chocolate flavored foodstuffs whereby an uncooked article is admixed with chocolate flavor which was previously formed by means of microwave heating.

Texturizers include precipitated silicon dioxide, for example, SIPERNAT® 50S (bulked density 6.2 pounds per cubic foot; particle size 8 microns; surface area 450 square meters per gram manufactured by the Degussa Corporation of Teterboro, N.J.). Other silicon dioxide texturizers are as follows:

SIPERNAT® 22S manufactured by Degussa Corporation;

ZEOTHIX® 265 manufactured by J. M. Huber Corporation of Havre de Grace, Md.;

CAB-O-SIL® EH-5 manufactured by the Cabot Corporation, of Tuscola, Ill.;

FIG. 2 sets forth a schematic block flow diagram of the process of my invention whereby, e.g., glycerine at 302 (which may be preheated) and reactants, leucine, phenyl alanine and sugar at location 301 are mixed in mixing means 304. The resulting mixture is then placed in microwave heating means 138 where heating takes place using the microwave radiation. The resulting chocolate flavored product may then be utilized at coating means 306. Dough is mixed at mixing means 309 and shaped into pre-cooked uncoated food articles at shaping means 307. The shaped dough is then transported to coating means 306 where the reaction product from 138 is coated onto the shaped pre-cooked food articles. The now coated shaped pre-cooked food articles are then further cooked (if desired) in heating means 311. The resulting chocolate flavored articles are then transported for marketing to location 310. The articles may be transported in their uncooked state (eliminating heating means 311) and instead, may be transported in a frozen state or at room temperature if practicable.

Figure 3:
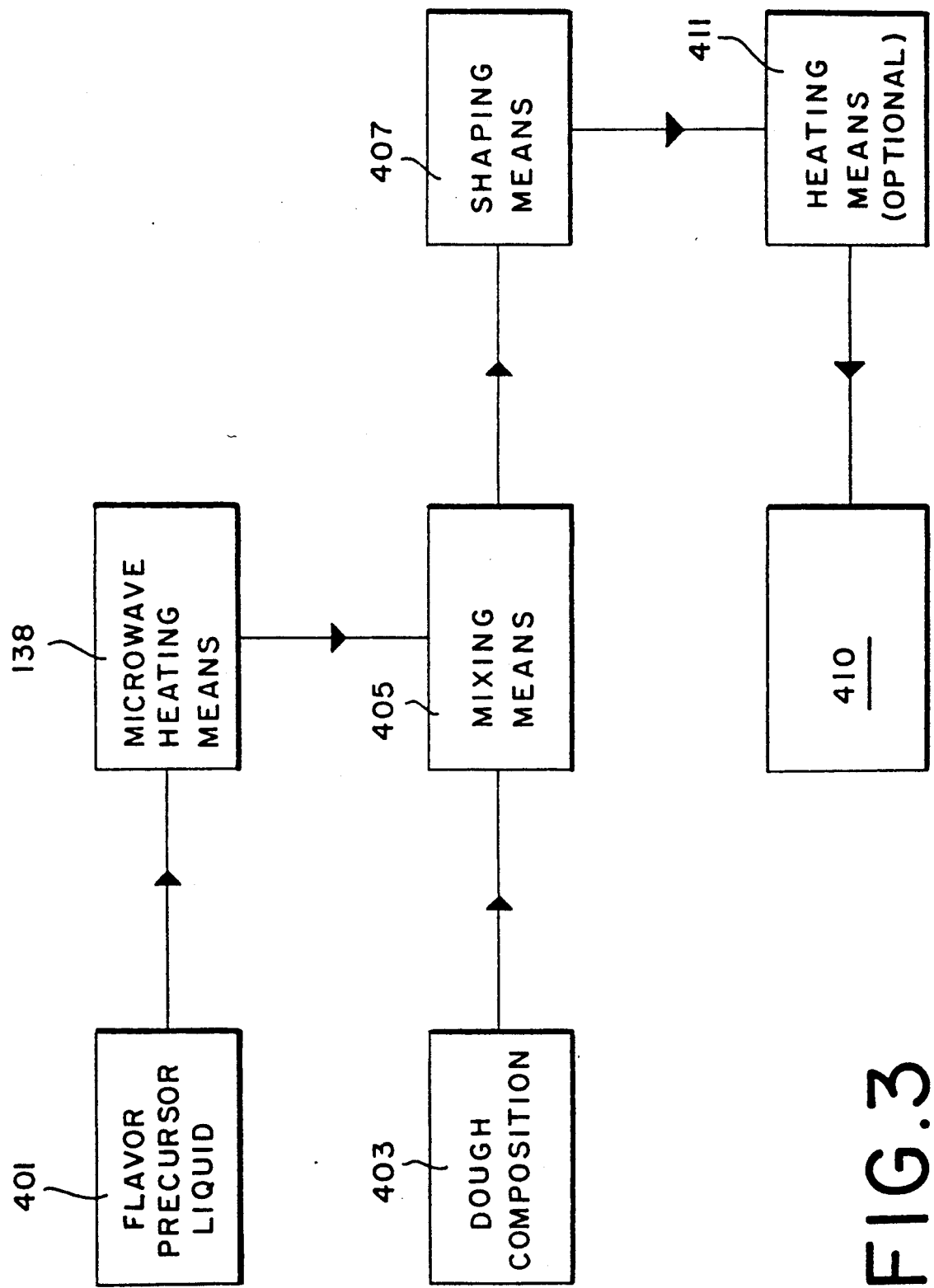
FIG. 3 is a block flow diagram showing the steps, in schematic form, for carrying out another aspect of the process of my invention; and indicating the multiple means (apparatus elements) useful in carrying out that aspect of the process of my invention wherein flavor precursor is heated via microwave heating means and the resulting flavor is admixed into the matrix of an uncooked food article prior to storage or subsequent heating.

FIG. 3 sets forth a schematic block flow diagram of another aspect of the process of my invention whereby flavor precursor liquid containing leucine, phenyl alanine, sugar and a mixture of glycerine and propylene glycol at location 401 are placed in microwave heating means 138. The resulting product is then heated via microwave radiation to form a chocolate flavor. The chocolate flavor is transported from microwave heating means 138 to mixing means 405 where the liquid chocolate flavor is mixed with dough composition from location 403. The resulting product, dough composition containing flavor is shaped at location 407 and then, if desired, the resulting product is reheated at location 411 either via microwave heating or via convection heating- The resulting product (heated or not) is then transported for marketing to location 410 (the product being at room temperature frozen or preheated).

In summary, the solvents useful in carrying my invention have dielectric constants which cause the heating of the reaction mass via microwave radiation to take place in under 120 seconds (in the range of from about 40 seconds up to about 120 seconds). Furthermore, the solvents useful in carrying out my invention have dielectric constants which cause the reaction using the microwave radiation to take place in a relatively short period of time depending on the amount of solvent utilized with the reaction mass. The weight ratios of sugar:amino acid:solvent may vary as follows:

(a) the weight ratio of amino acid (e.g., phenyl alanine and leucine) to sugar may vary from about 0.5:1 up to about 1.5:0.5 (or 3:1).

(b) The weight ratio of sugar:solvent may vary from about 1:12 up to about 1:5 as the preferred range. Higher amounts of solvent may be utilized with practicable results as will be seen from an examination of the examples, infra.

Referring to FIGS. 4 and 5, FIGS. 4 and 5 are GLC profiles of reaction products produced according to Example V. FIG. 4 is the GLC profile of the reaction product produced by means of convection heating. FIG. 5 is the GLC profile of the chocolate flavor reaction product produced by means of microwave heating according to Example V, infra.

In FIG. 5, the peak indicated by reference numeral 701 is the peak for acetaldehyde. The peak indicated by reference numeral 702 is the peak for the freon extraction agent.

The peak indicated by reference numeral 703 is the peak for isovaleraldehyde. The peak indicated by reference numeral 704 is the peak for 2,5-dimethyl pyrazine. The peak indicated by reference numeral 705 is the peak for benzaldehyde. The peak indicated by reference numeral 706 is the peak for alpha-methyl styrene. The peak indicated by reference numeral 707 is the peak for 2,3,5-trimethyl pyrazine. The peak indicated by reference numeral 708 is the peak for phenyl acetaldehyde. The peak indicated by reference numeral 709 is the peak for 2-acetyl pyrrole. The peak indicated by reference numeral 710 is the peak for n-nonanal. The peak indicated by reference numeral 711 is the peak for 5-methyl-2-isopropyl-2-hexenal. The peak indicated by reference numeral 712 is the peak for an unknown-aromatic. The peak indicated by reference numeral 713 is the peak for 2-butyl-3-methyl pyrazine. The peak indicated by reference numeral 714 is the peak for a substituted methyl pyrazine. The peak indicated by reference numeral 715 is the peak for isoamyl dimethyl pyrazine. The peak indicated by reference numeral 716 is the peak for a mixture of glycol esters of isobutyric acid. The indicated by reference numeral 717 is the peak for COCAL ® the compound having the structure:

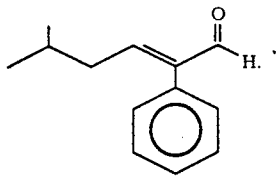

The peak indicated by reference numeral 718 is the peak for diethyl phthalate. The peak indicated by reference numeral 719 is for 2-benzylidene heptenal. The peak indicated by reference numeral 720 is the peak for dibutyl phthalate. The peak indicated by reference numeral 721 is for an unsaturated hydrocarbon.

With reference to FIG. 5, the peak indicated by reference numeral 801 is for acetaldehyde. The peak indicated by reference numeral 802 is for the freon extraction material. The peak indicated by reference numeral 803 is for isovaleraldehyde. The peak indicated by reference numeral 804 is for 2,5-dimethyl pyrazine. The peak indicated by reference numeral 805 is for benzaldehyde. The peak indicated by reference numeral 806 is for ethyl isovalerate. The peak indicated by reference numeral 807 is for alpha-methyl styrene. The peak indicated by reference numeral 808 is for 2,3,5-trimethyl pyrazine. The peak indicated by reference numeral 809 is for phenyl acetaldehyde. The peak indicated by reference numeral 810 is for 2-acetyl pyrrole. The peak indicated by reference numeral 811 is for n-nonanal. The peak indicated by reference numeral 812 is for 5-methyl-2-isopropyl-2-hexenal. The peak indicated by reference numeral 813 is for 2-butyl-3-methyl pyrazine The peak indicated by reference numeral 814 is for a substituted methyl pyrazine. The peak indicated by reference numeral 815 is for isoamyl dimethyl pyrazine. The peak indicated by reference numeral 816 is for a mixture of glycol esters of isobutyric acid. The peak indicated by reference numeral 817 is for COCAL ® having the structure:

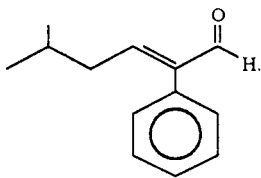

The peak indicated by reference numeral 818 is for diethyl phthalate. The peak indicated by reference numeral 819 is for dibutyl phthalate. The peak indicated by reference numeral 820 is for an unsaturated hydrocarbon.

It should be noted that an additional advantage achieved in practicing our invention wherein the flavor precursor liquid composition is coated onto uncooked baked goods foodstuffs is that water evaporation is retarded when the resulting coated product is cooked in a microwave oven. This advantage, too is unexpected, unobvious and advantageous.

The principles given above are illustrated in the following examples.

EXAMPLE I

Into 100 ml beakers were placed exactly 40.4 g of solvent. Each beaker was irradiated with 2,450 MHz microwave radiation for 20 seconds, afterwhich the solvents temperature was measured. Experiments were run in triplicate. The results for several solvents are set forth in the following Table II.

TABLE II

| SOLVENT | TEMPERATURE (°C.) |
|---|---|
| Propylene glycol | 91 |
| Glycerine | 88 |
| Ethanol | 78 |
| Water | 61 |
| Triacetin | 80 |

EXAMPLE II

Blotters weighing 0.61 g were dosed with 0.10 g of test solutions. The test solutions are each placed on the center of each of the blotters. Blotters spotted in this manner were irradiated with 2450 MHz microwave (750 watts) radiation for various periods of time, starting at 20 seconds. The results of testing variables are summarized in Table III.

The microwave radiation source is a 750 watt Amana RADARANGE ® Microwave Oven (trademark of the Amana Corporation).

TABLE III

| ENTRY | AMINO ACIDS | AMINO ACID WEIGHT | SUGAR | SUGAR WEIGHT | SOLVENT | SOLVENT WEIGHT | pH | pH ADJUSTMENT AGENT |
|---|---|---|---|---|---|---|---|---|
| II-1 | PHENYL ALANINE (MW 131.2) LEUCINE (MW 165.2) | 5.0 g 4.0 g | RIBOSE | 4.5 g | ETHANOL GLYCERINE | 16 g 25 g | 7–8 | NaHCO₃ (MW84) |
| II-2 | PHENYL ALANINE LEUCINE | 5.0 g 4.0 g | RHAMNOSE | 5.5 g | ETHANOL GLYCERINE | 16 g 75 g | 7–8 | NaHCO₃ |
| II-3 | PHENYL ALANINE LEUCINE | 5.0 g 4.0 g | RHAMNOSE | 5.5 g | ETHANOL GLYCERINE | 16 g 25 g | 7–8 | NaHCO₃ |
| II-4 | PHENYL ALANINE LEUCINE | 5.0 g 4.0 g | RHAMNOSE | 5.5 g | ETHANOL GLYCERINE | 16 g 75 g | 7–8 | NaHCO₃ |
| II-5 | PHENYL ALANINE LEUCINE | 5.0 g 4.0 g | CERELOSE | 5.5 g | ETHANOL GLYCERINE | 16 g 25 g | 7–8 | NaHCO₃ |
| II-6 | PHENYL ALANINE LEUCINE | 5.0 g 4.0 g | CERELOSE | 5.5 g | ETHANOL GLYCERINE | 16 g 75 g | 7–8 | NaHCO₃ |
| II-7 | PHENYL ALANINE LEUCINE | 5.0 g 4.0 g | CERELOSE | 11.0 g | ETHANOL GLYCERINE | 16 g 75 g | 7–8 | NaHCO₃ |

| ENTRY | pH ADJUSTMENT AGENT WEIGHT | MICROWAVE TIME | COLOR APPEARANCE | AROMA |
|---|---|---|---|---|
| II-1 | 2.7 g | 20 sec. | TAN BURNT | MALTY COCOA |
| II-2 | 2.7 g | 20 sec. 40 sec. | YELLOW LIGHT BROWN | FAINT CHOCOLATE FAINT CHOCOLATE |
| II-3 | 5.4 g | 20 sec. 40 sec. | LIGHT BROWN BROWN | CHOCOLATE CHOCOLATE |
| II-4 | 4.5 g | 20 sec. 40 sec. | BROWN DARK BROWN | CHOCOLATE DARK COCOA |
| II-5 | 5.4 g | 20 sec. 40 sec. 60 sec. | LIGHT YELLOW LIGHT BROWN NO CHANGE | NONE FAINT CHOCOLATE |
| II-6 | 5.4 g | 20 sec. 40 sec. 60 sec. | BROWN YELLOW BROWN DARK BROWN | NONE CHOCOLATE DARK CHOCOLATE |
| II-7 | 5.4 g | 20 sec. 40 sec. 60 sec. | NONE TAN LIGHT BROWN | NONE FAINT CHOCOLATE MILK CHOCOLATE |

EXAMPLE III

Formation of Drum Chilled Chocolate Flavor Powder

The following mixture is prepared:

| Ingredients | Parts by Weight |
|---|---|
| Sugar-amino acid composition of Example II-6 (10.0 grams phenyl alanine, 8.0 grams leucine and 11 grams cerelose; admixed with 60 grams of a 50:50 mixture of glycerine and propylene glycol; heated in a 1050 watt microwave oven for 4 minutes. | 30 grams |
| 20% MYVEROL ® 1806 in DURKEE ® 17 (MYVEROL ® is a fatty acid mono glyceride and DURKEE ® 17 is a stearic acid ester manufactured by the Glidden-Durkee Corporation of St. Louis, Missouri) | 24 grams |
| SIPERNAT ® 50S (a precipitated silicon dioxide composition having a bulk density of 6.2 pounds per cubic foot; an average particle size of 8 microns; and a surface area of 450 square meters per gram manufactured by the Degussa Corporation of Teterboro, New Jersey) | 6 grams |

The flavor composition is intimately admixed with the SIPERNATE ® 50S in a Hobart mixer (No. 1 speed for 5 minutes). The mix becomes a mass of paste and the resulting mass is intimately admixed with the mixture (30% MYVEROL ® 1806 and 70% STEARINE ® 17).

The resulting product is drum chilled at a speed of 5 units in a small unit drum-drier producing 0.5 pounds per minute. The temperature of the feed is 170° F. The drum-drier is:

Blaw-Knox Model 639.

The drum chilled films are crushed and sifted through a Baker's screen basket and then sieved through a No. 10 sieve.

EXAMPLE IV

Production of Chocolate Cake

The following materials are utilized in various combinations as set forth in Examples IV(A), IV(B) and IV(C), infra.

| Ingredients | Parts by Weight |
|---|---|
| Egg | 100 g |
| Water | 300 g |
| Corn Oil | 100 g |
| Flavor Product (of Example II) | 255 g |
| Sodium chloride | 2 g |
| Baking powder | 3 g |
| CRISCO ® (a trademark of the Procter & Gamble Company of Cincinnati, Ohio) | 40 g |
| Sugar | 200 g |
| Baker's chocolate | 4.5 g |
| Product of Example III | 0.5 g |

EXAMPLE IV(A)

The egg, water, corn oil, flavor precursor mixture, salt, baking soda, CRISCO ® shortening, sugar and melted baker's chocolate are intimately admixed.

EXAMPLE IV(B)

The egg, water, corn oil, flavor precursor composition of Example II-6, salt, baking soda, CRISCO ® shortening, sugar, melted baker's chocolate and the product of Example III are intimately admixed.

EXAMPLE IV(C)

The melted baker's chocolate and product of Example III are intimately admixed. The mixture is added to corn oil, CRISCO ® and shortening. Then egg, water, sodium chloride, baking soda and flour is added and the resulting product is intimately admixed.

Doughs' from Examples IV(A), IV(B) and IV(C) were baked separately in a 1050 watt microwave oven for 12 minutes turning 90 degrees after six minutes.

In a blind panel test:
(i) cakes (A) and (B) were judged to be equal to each other by taste and room aroma; and
(ii) cake (C) was unanimously judged to be superior in chocolate taste and room aroma with reference to cakes (A) and (B), being more natural and having a strength about twice that of (A) and (B).

On an organoleptic scale of 1-10 (with 1 being the least preferred and 10 being the most preferred) cake (A) was given a value of 7; cake (B) was given a value of 7 and cake (C) was given a value of 10.

EXAMPLE V

Into two 200 ml beakers were placed two samples of the following mixture of ingredients:

| Ingredients | Weight |
|---|---|
| Phenylalanine | 5.0 grams |
| Leucine | 4.0 grams |
| Ethyl alcohol | 16.0 grams |
| Glycerine | 75.0 grams |
| Sodium bicarbonate | 5.4 grams |
| Cerelose | 5.5 grams. |

Each of the solutions was stirred at 40° C. for one hour; until most of the ingredients dissolved. The resulting solutions remained cloudy and were therefor filtered. The resulting supernatant liquids were treated as follows:

(a) 22 grams of the solution was treated in a microwave oven until brown (total time: 30 seconds);
(b) 22 grams of the solution was treated on a hot plate at 82–85° C. for a period of 45 minutes until it was the same color as the sample of (a).

Both solutions (a) and solutions (b) were tested by a taste panel. The taste panel found that both solutions had good chocolate character. The solution of (b) was more sweet and milk chocolate-like. The solution of (a) had a dark bitter chocolate nuance absent from the solution of (b).

FIG. 4 sets forth a GLC profile of solution (a) the analysis for which is set forth on page 5, supra. FIG. 5 sets forth the GLC profile of solution (b) the analysis of which is set forth on page 5, supra.

The microwave radiation source is a 750 watt AMANA RADARANGE ® Microwave Oven (trademark of the Amana Corporation).

The following Table III(A) sets forth a comparison of the quantities of the various products produced via convection heating and via microwave heating using the same reaction ingredients as set forth in this example, supra:

TABLE III(A)

| RETENTION TIME | | | AREA PERCENT | |
|---|---|---|---|---|
| HEATED (FIG. 4) | MICROWAVE (FIG. 5) | COMPOUND | HEATED (FIG. 4) | MICROWAVE (FIG. 5) |
| 3.15 | 3.55 | acetaldehyde | 0.82 | 1.18 |
| — | 4.45 | ethyl acetate | 0.05 | 2.12 |
| 4.25 | 5.06 | isovaleraldehyde | 1.20 | 1.54 |
| 4.34 | — | 2-methyl butanal | 0.19 | 0.10 |
| — | 7.24 | ethyl lactate | — | 0.16 |
| — | 7.34 | 2-methyl pyrazine | — | 0.22 |
| 9.31 | 10.13 | 2,5-dimethyl pyrazine | 8.62 | 8.17 |
| — | 10.30 | 2,3-dimethyl pyrazine | — | 0.12 |
| 11.02 | 11.43 | unknown molecular weight:142 | 0.88 | 0.37 |
| 11.24 | 12.05 | benzaldehyde | 2.10 | 1.61 |
| — | 12.39 | ethyl isovalerate | — | 0.22 |
| 12.58 | 13.41 | alpha-methyl styrene | 1.97 | 4.39 |
| 13.28 | 14.10 | 2,3,5-trimethyl pyrazine | 1.29 | 2.36 |
| 14.59 | 15.39 | benzyl alcohol | 0.14 | 0.13 |
| 15.16 | 15.55 | phenyl acetaldehyde | 13.48 | 3.00 |
| — | 16.44 | 2-acetylpyrrole | 0.05 | 0.68 |
| 19.22 | 20.03 | nonanal | 0.88 | 0.20 |
| 19.59 | 20.40 | 5-methyl-2-isopropyl-2-hexenal isomer | 0.26 | 1.66 |
| 20.21 | 21.02 | 5-methyl-2-isopropyl-2- | 0.29 | 0.68 |

TABLE III(A)-continued

| RETENTION TIME | | | AREA PERCENT | |
|---|---|---|---|---|
| HEATED (FIG. 4) | MICROWAVE (FIG. 5) | COMPOUND | HEATED (FIG. 4) | MICROWAVE (FIG. 5) |
| 22.35 | — | hexenal isomer benzyl acetate | 0.10 | — |
| — | 24.31 | isoamyl pyrazine | — | 0.76 |
| — | 26.10 | quinoxaline | — | 0.24 |
| 26.18 | 26.58 | unknown-aromatic | 1.84 | 0.13 |
| — | 27.33 | 2-phenyl furan | — | 0.30 |
| — | 28.16 | 4-phenyl-2-butanone | 0.08 | 0.35 |
| — | 28.33 | ethyl phenyl acetate | — | 0.01 |
| 28.43 | 29.23 | 2-butyl-3-methyl pyrazine | 0.43 | 1.77 |
| 28.55 | 29.38 | substituted methyl pyrazine | 0.35 | 2.21 |
| 29.34 | 30.15 | substituted methyl pyrazine | 3.42 | 4.80 |
| 33.21 | 34.02 | isoamyl dimethyl pyrazine | 6.58 | 7.77 |
| 36.16 | 36.54 | a glycol ester of isobutyric acid | 1.61 | 0.80 |
| 37.30 | 38.09 | a glycol ester of isobutyric acid | 3.40 | 1.45 |
| 44.23 | 45.02 | COCAL ® | 1.55 | 3.37 |
| 49.35 | 50.15 | unknown | 6.29 | 1.28 |
| 50.19 | 50.56 | diethyl phthalate | 3.01 | 0.46 |
| 53.14 | 53.55 | unknown | 1.49 | 4.48 |
| 54.24 | — | 2-benzylidene heptanal | 3.20 | — |
| 71.32 | 72.11 | dibutyl phthalate | 8.67 | 4.91 |
| 78.17 | 78.57 | unsaturated hydrocarbon | 9.01 | 7.10 |
| 78.39 | 79.17 | unsaturated hydrocarbon | 2.45 | 1.99 |
| | | | 85.70 | 73.09 |

EXAMPLE VI

Blotters weighing 0.61 grams were dosed with 0.10 grams of test solutions. The test solution was placed on the center of the blotter. Blotters spotted in this manner were irradiated with 2450MHz microwave (750 watts) radiation for various periods of time, starting at 20 seconds. The results of testing variables are summarized in Tables IV, V, VI, VII, VIII and IX.

The microwave radiation source is a 750 watt Amana RADARRANGE ® microwave oven.

TABLE IV

| Experiments | Amino Acid | Amino Acid Wt. | Sugar | Sugar Wt. | Solvent | Solvent Wt. | pH |
|---|---|---|---|---|---|---|---|
| 1 | Proline | 3.7 g | Rhamnose | 5.3 g | Ethanol | 16 g | 9-10 |
| 2 | Proline | 3.7 g | Rhamnose | 5.3 g | Ethanol Glycerine | 16 g 25 g | 9-10 |
| 3 | Proline | 3.7 g | Rhamnose | 5.3 g | Ethanol | 16 g | 9-10 |
| 4 | Proline | 3.7 g | Rhamnose | 5.3 g | Ethanol Glycerine | 16 g 25 g | 9-10 |
| 5 | Proline | 3.7 g | Rhamnose | 5.3 g | Ethanol Glycerine | 16 g 50 g | 9-10 |
| 6 | Proline | 3.7 g | Rhamnose | 5.3 g | Ethanol Glycerine | 16 g 75 g | 9-10 |
| 7 | Proline | 3.7 g | Rhamnose | 5.3 g | Ethanol Glycerine | 16 g 175 g | 9-10 |
| 8 | Proline | 3.5 g | Ribose | 4.5 g | Ethanol | 16 g | 9-10 |
| 9 | Proline | 3.5 g | Ribose | 4.5 g | Ethanol Glycerine | 16 g 25 g | 9-10 |
| 10 | Proline | 3.5 g | Ribose | 4.5 g | Ethanol Glycerine | 16 g 50 g | 9-10 |
| 11 | Proline | 3.5 g | Ribose | 4.5 g | Ethanol Glycerine | 16 g 50 g | 9-10 |

| Experiments | pH ADJ Agent | pH ADJ Agent Wt. | Microwave Time | Color Appearance | Aroma |
|---|---|---|---|---|---|
| 1 | NaHCO$_3$ | 2.7 g | 80 sec. | White | None |
| 2 | NaHCO$_3$ | 2.7 g | 40 sec. | Burnt Brown | Burnt Crusty |
| | | | 20 sec. | Golden Brown | Bready Sweet |
| 3 | NaHCO$_3$ HOAc | 2.7 g 2.2 g | 40 sec. 80 sec. 120 sec. | White White White | None None None |
| 4 | NaHCO$_3$ HOAc | 2.7 g 2.2 g | 20 sec. | Golden Brown | Bready Sweet |
| 5 | NaHCO$_3$ | 2.7 g | 20 sec. | Golden Brown | Bready Sweet |
| 6 | NaHCO$_3$ | 2.7 g | 20 sec. | Dark Brown | Bready |
| 7 | NaHCO$_3$ | 2.7 g | 20 sec. | Golden Brown | Bready |
| 8 | NaHCO$_3$ | 2.7 g | 80 sec. | White | None |
| 9 | NaHCO$_3$ | 2.7 g | 20 sec. | Dry Dark | Burnt |

TABLE IV-continued

| | | | | Brown | Bready |
|---|---|---|---|---|---|
| 10 | NaHCO$_3$ | 2.7 g | 20 sec. | Dark Brn. | Sweet |
| | | | | Golden | Bready |
| 11 | NaHCO$_3$ | 2.7 g | 20 sec. | Golden | Sweet |
| | HOAc | 5.0 g | | Brown | Bready |

TABLE V

| Experiments | Amino Acid | Amino Acid Wt. | Sugar | Sugar Wt. | Solvent | Solvent Wt. | pH |
|---|---|---|---|---|---|---|---|
| 12 | Proline | 3.5 g | Ribose | 4.5 g | Ethanol | 16 g | 9–10 |
| | | | | | Triacetin | 25 g | |
| 13 | Proline | 3.5 g | Ribose | 4.5 g | Ethanol | 16 g | 9–10 |
| | | | | | Propylene Glycol | 25 g | |
| 14 | Proline | 3.5 g | Ribose | 4.5 g | Ethanol | 16 g | 9–10 |
| | | | | | Water | 25 g | |
| 15 | Proline | 3.5 g | Ribose | 4.5 g | Ethanol | 16 g | 9–10 |
| | | | | | Glycerine | 25 g | |
| | Color of Sample Deterioates To Blood Red After 7 Days; EDTA Added Did Not Prevent This | | | | | | |
| 16 | Proline | 3.5 g | Ribose | 4.5 g | Ethanol | 16 g | 9–10 |
| | | | | | Glycerine | 25 g | |
| | Repeat of 9; Color Deteriorated To Blood Red In 7 Days. | | | | | | |
| 17 | Proline | 3.5 g | Rhamnose | 5.5 g | Ethanol | 16 g | 9–10 |
| | | | | | Glycerine | 75 g | |
| 18 | Proline | 3.5 g | Ribose | 4.5 g | Ethanol | 16 g | 9–10 |
| | | | | | Glycerine | 25 g | |
| | Repeat of 9 Without NaHCO$_3$; Color Remained Yellow After 7 Days. | | | | | | |
| 19 | Proline | 3.5 g | Rhamnose | 5.5 g | Ethanol | 16 g | 9–10 |
| | | | | | Glycerine | 75 g | |
| 20 | Proline | 3.5 g | Rhamnose | 5.5 g | Glycerine | 75 g | 9–10 |

| Experiments | pH ADJ Agent | pH ADJ Agent Wt. | Microwave Time | Color Appearance | Aroma |
|---|---|---|---|---|---|
| 12 | NaHCO$_3$ | 2.7 g | 80 sec. | White | None |
| 13 | NaHCO$_3$ | 2.7 g | 20 sec. | Yellow | Slt Sweet |
| | | | 40 sec. | Dk. Yellow | Sweet |
| | | | 80 sec. | Golden | Sweet Bready |
| 14 | NaHCO$_3$ | 2.7 g | 20 sec. | White | None |
| | | | 40 sec. | White | None |
| | | | 80 sec. | White | None |
| 15 | NaHCO$_3$ | 2.7 g 0.1 g | 20 sec. | Same as 9 | |
| | Color of Sample Deterioates To Blood Red After 7 Days; EDTA Added Did Not Prevent This | | | | |
| 16 | NaHCO$_3$ | 2.7 g | 20 sec. | Vry Dark Brown | Burnt Bready |
| | Repeat of 9; Color Deteriorated To Blood Red in 7 Days. | | | | |
| 17 | NaHCO$_3$ | 2.7 g | 20 sec. | Drk Brown | Burnt Sugar |
| | | | 40 sec. | Drk Golden Brown | Sweet Hot Buns |
| 18 | None | | 20 sec. | Yellow | Slt Sweet |
| | | | 40 sec. | Golden | Slt Sweet |
| | Repeat of 9 Without NaHCO$_3$; Color Remained Yellow After 7 Days. | | | | |
| 19 | NaHCO$_3$ | 5.0 g | 20 sec. | Burnt Blackened | Burnt Bread |
| 20 | NaHCO$_3$ | 2.7 g | 20 sec. | Burnt Blackened | Burnt Bread |

TABLE VI

| Experiments | Amino Acid | Amino Acid Wt. | Sugar | Sugar Wt. | Solvent | Solvent Wt. | pH |
|---|---|---|---|---|---|---|---|
| 21 | Alanine | 2.7 g | Ribose | 4.5 g | Ethanol | 16 g | 9–10 |
| | | | | | Glycerine | 25 g | |
| 22 | Alanine | 2.7 g | Rhamnose | 5.5 g | Ethanol | 16 g | 9–10 |
| | | | | | Glycerine | 75 g | |
| 23 | Alanine | 2.7 g | Cerelose | 5.5 g | Ethanol | 16 g | 9–10 |
| | | | | | Glycerine | 25 g | |
| 24 | Lysine | 4.4 g | Ribose | 4.5 g | Ethanol | 16 g | 9–10 |
| | | | | | Glycerine | 25 g | |
| 25 | Lysine | 4.4 g | Rhamnose | 5.5 g | Ethanol | 16 g | 9–10 |
| | | | | | Glycerine | 75 g | |
| 26 | Lysine | 4.4 g | Cerelose | 5.5 g | Ethanol | 16 g | 9–10 |
| | | | | | Glycerine | 25 g | |
| 27 | Proline | 3.5 g | Cerelose | 5.5 g | Ethanol | 16 g | 9–10 |

TABLE VI-continued

| | | | | | Glycerine | 25 g | |
|---|---|---|---|---|---|---|---|
| 28 | Proline | 3.5 g | Fructose | 5.5 g | Ethanol | 16 g | 9-10 |
| | | | | | Glycerine | 25 g | |
| 29 | Proline | 3.5 g | Fructose | 5.5 g | Ethanol | 16 g | 9-10 |
| | | | | | Glycerine | 50 g | |
| 30 | Glycine | 2.3 | Ribose | 4.5 g | Ethanol | 16 g | 9-10 |
| | | | | | Glycerine | 25 g | |
| 31 | Glycine | 2.3 | Rhamnose | 5.5 g | Ethanol | 16 g | 9-10 |
| | | | | | Glycerine | 75 g | |
| 32 | Glycine | 2.3 | Cerelose | 5.5 g | Ethanol | 16 g | 9-10 |
| | | | | | Glycerine | 25 g | |
| 33 | Proline | 3.5 g | Glucose | 5.5 g | Ethanol | 16 g | 9-10 |
| | | | | | Glycerine | 25 g | |

| Experiments | pH ADJ Agent | pH ADJ Agent Wt. | Microwave Time | Color Appearance | Aroma |
|---|---|---|---|---|---|
| 21 | NaHCO3 | 2.7 g | 20 sec. | Dark Brn | Crusty Burnt |
| 22 | NaHCO3 | 2.7 g | 20 sec. | Golden | Sugary |
| | | | 40 sec. | Lite Brn. | Sugcookie |
| 23 | NaHCO3 | 2.7 g | 20 sec. | Lite Brn | None |
| | | | 40 sec. | Black | Burnt Crust |
| 24 | NaHCO3 | 2.7 g | 20 sec. | Chared Black | Badly Burnt |
| 25 | NaHCO3 | 2.7 g | 20 sec. | Brown Browner | Crusty Crusty |
| 26 | NaHCO3 | 2.7 g | 20 sec. | Chared Burnt | Good Crusty |
| 27 | NaHCO3 | 2.7 g | 20 sec. | Drk Brn | Burnt Bread |
| 28 | NaHCO3 | 2.7 g | 80 sec. | Drk Brn | Cooked Pancake |
| 29 | NaHCO3 | 2.7 g | 20 sec. | Drk Brn Less Than 28 | Plastic |
| 30 | NaHCO3 | 2.7 g | 20 sec. | Dark Brn. | Sweet Bready |
| 31 | NaHCO3 | 2.7 g | 20 sec. | Lite Brn | Sweet |
| | | | 40 sec. | Drk Brn | Swt Crust |
| 32 | NaHCO3 | 2.7 g | 20 sec. | Brown | None |
| | | | 40 sec. | Brown | None |
| 33 | NaHCO3 | 2.7 g | 20 sec. | Charred | Plastic |

TABLE VII

| EXPERIMENT | AMINO ACIDS | AMINO ACID WEIGHT | SUGAR | SUGAR WEIGHT | SOLVENT | SOLVENT WEIGHT | pH | pH ADJUSTMENT AGENT |
|---|---|---|---|---|---|---|---|---|
| 34 | PHENYL ALANINE (MW 131.2) LEUCINE (MW 165.2) | 5.0 g 4.0 g | RIBOSE | 4.5 g | ETHANOL GLYCERINE | 16 g 25 g | 9-10 | NaHCO3 (MW84) |
| 35 | PHENYL ALANINE LEUCINE | 5.0 g 4.0 g | RHAMNOSE | 5.5 g | ETHANOL GLYCERINE | 16 g 75 g | 9-10 | NaHCO3 |
| 36 | PHENYL ALANINE LEUCINE | 5.0 g 4.0 g | RHAMNOSE | 5.5 g | ETHANOL GLYCERINE | 16 g 25 g | 9-10 | NaHCO3 |
| 37 | PHENYL ALANINE LEUCINE | 5.0 g 4.0 g | RHAMNOSE | 5.5 g | ETHANOL GLYCERINE | 16 g 75 g | 9-10 | NaHCO3 |
| 38 | PHENYL ALANINE LEUCINE | 5.0 g 4.0 g | CERELOSE | 5.5 g | ETHANOL GLYCERINE | 16 g 25 g | 9-10 | NaHCO3 |
| 39 | PHENYL ALANINE LEUCINE | 5.0 g 4.0 g | CERELOSE | 5.5 g | ETHANOL GLYCERINE | 16 g 75 g | 9-10 | NaHCO3 |
| 40 | PHENYL ALANINE LEUCINE | 5.0 g 4.0 g | CERELOSE | 11.0 g | ETHANOL GLYCERINE | 16 g 75 g | 9-10 | NaHCO3 |

| EXPERIMENT | pH ADJUSTMENT AGENT WEIGHT | MICROWAVE TIME | COLOR APPEARANCE | AROMA |
|---|---|---|---|---|
| 34 | 2.7 g | 20 sec. | TAN BURNT | MALTY COCOA |
| 35 | 2.7 g | 20 sec. | YELLOW | FAINT CHOCOLATE |
| | | 40 sec. | LIGHT BROWN | FAINT CHOCOLATE |
| 36 | 5.4 g | 20 sec. | LIGHT BROWN | CHOCOLATE |
| | | 40 sec. | BROWN | CHOCOLATE |
| 37 | 4.5 g | 20 sec. | BROWN | CHOCOLATE |
| | | 40 sec. | DARK BROWN | DARK COCOA |

TABLE VII-continued

| | | | | |
|---|---|---|---|---|
| 38 | 5.4 g | 20 sec. | LIGHT YELLOW | NONE |
| | | 40 sec. | LIGHT BROWN | FAINT CHOCOLATE |
| | | 60 sec. | NO CHANGE | |
| 39 | 5.4 g | 20 sec. | BROWN YELLOW | NONE |
| | | 40 sec. | BROWN | CHOCOLATE |
| | | 60 sec. | DARK BROWN | DARK CHOCOLATE |
| 40 | 5.4 g | 20 sec. | NONE | NONE |
| | | 40 sec. | TAN | FAINT CHOCOLATE |
| | | 60 sec. | LIGHT BROWN | MILK CHOCOLATE |

TABLE VIII

| EXPERIMENT | AMINO ACIDS | AMINO ACID WEIGHT | SUGAR | SUGAR WEIGHT | SOLVENT | SOLVENT WEIGHT | pH | pH ADJUSTMENT AGENT |
|---|---|---|---|---|---|---|---|---|
| 41 | PHENYL ALANINE (MW 131.2) | 5.0 g | RIBOSE | 4.5 g | ETHANOL | 16 g | 9–10 | NaHCO$_3$ (MW84) |
| | LEUCINE (MW 165.2) | 4.0 g | | | | | | |
| 42 | PHENYL ALANINE | 5.0 g | RHAMNOSE | 5.5 g | ETHANOL | 16 g | 9–10 | NaHCO$_3$ |
| | LEUCINE | 4.0 g | | | | | | |
| 43 | PHENYL ALANINE | 5.0 g | RHAMNOSE | 5.5 g | ETHANOL | 16 g | 9–10 | NaHCO$_3$ |
| | LEUCINE | 4.0 g | | | | | | |
| 44 | PHENYL ALANINE | 5.0 g | RHAMNOSE | 5.5 g | ETHANOL | 16 g | 9–10 | NaHCO$_3$ |
| | LEUCINE | 4.0 g | | | | | | |
| 45 | PHENYL ALANINE | 5.0 g | CERELOSE | 5.5 g | ETHANOL | 16 g | 9–10 | NaHCO$_3$ |
| | LEUCINE | 4.0 g | | | | | | |
| 46 | PHENYL ALANINE | 5.0 g | CERELOSE | 5.5 g | ETHANOL | 16 g | 9–10 | NaHCO$_3$ |
| | LEUCINE | 4.0 g | | | | | | |
| 47 | PHENYL ALANINE | 5.0 g | CERELOSE | 11.0 g | ETHANOL | 16 g | 9–10 | NaHCO$_3$ |
| | LEUCINE | 4.0 g | | | | | | |

| EXPERIMENT | pH ADJUSTMENT AGENT WEIGHT | MICROWAVE TIME | COLOR APPEARANCE | AROMA |
|---|---|---|---|---|
| 41 | 2.7 g | 20 sec. | White | None |
| | | | White | None |
| 42 | 2.7 g | 20 sec. | White | None |
| | | 40 sec. | White | None |
| 43 | 5.4 g | 20 sec. | White | None |
| | | 40 sec. | White | None |
| 44 | 4.5 g | 20 sec. | White | None |
| | | 40 sec. | White | None |
| 45 | 5.4 g | 20 sec. | White | None |
| | | 40 sec. | White | None |
| | | 60 sec. | White | None |
| 46 | 5.4 g | 20 sec. | White | None |
| | | 40 sec. | White | None |
| | | 60 sec. | White | None |
| 47 | 5.4 g | 20 sec. | White | None |
| | | 40 sec. | White | None |
| | | 60 sec. | White | None |

TABLE IX

| EXPERIMENT | AMINO ACIDS | AMINO ACID WEIGHT | SUGAR | SUGAR WEIGHT | SOLVENT | SOLVENT WEIGHT | pH | pH ADJUSTMENT AGENT |
|---|---|---|---|---|---|---|---|---|
| 48 | PHENYL ALANINE (MW 131.2) | 5.0 g | RIBOSE | 4.5 g | Propylene Glycol | 40 g | 9–10 | NaHCO$_3$ (MW84) |
| | LEUCINE (MW 165.2) | 4.0 g | | | | | | |
| 49 | PHENYL ALANINE | 5.0 g | RHAMNOSE | 5.5 g | Propylene Glycol | 16 g | 9–10 | NaHCO$_3$ |
| | LEUCINE | 4.0 g | | | Glycerine | 75 g | | |
| 50 | PHENYL ALANINE | 5.0 g | RHAMNOSE | 5.5 g | Propylene Glycol | 16 g | 9–10 | NaHCO$_3$ |
| | LEUCINE | 4.0 g | | | Glycerine | 25 g | | |
| 51 | PHENYL ALANINE | 5.0 g | RHAMNOSE | 5.5 g | Propylene Glycol | 40 g | 9–10 | NaHCO$_3$ |
| | LEUCINE | 4.0 g | | | | | | |
| 52 | PHENYL | | CERELOSE | 5.5 g | Propylene | 16 g | 9–10 | NaHCO$_3$ |

TABLE IX-continued

| | | | | | | | | | |
|---|---|---|---|---|---|---|---|---|---|
| 53 | ALANINE<br>LEUCINE<br>PHENYL<br>ALANINE<br>LEUCINE | 5.0 g<br>4.0 g<br>5.0 g<br>4.0 g | CERELOSE | 5.5 g | Glycol<br>Glycerine<br>Propylene<br>Glycol | 25 g<br>40 g | 9-10 | NaHCO$_3$ |
| 54 | PHENYL<br>ALANINE<br>LEUCINE | 5.0 g<br>4.0 g | CERELOSE | 11.0 g | Propylene<br>Glycol | 40 g | 9-10 | NaHCO$_3$ |

| | EXPERI-<br>MENT | pH ADJUSTMENT<br>AGENT WEIGHT | MICROWAVE<br>TIME | COLOR<br>APPEARANCE | AROMA |
|---|---|---|---|---|---|
| | 48 | 2.7 g | 20 sec. | TAN | MALTY<br>BURNT COCOA |
| | 49 | 2.7 g | 20 sec.<br>40 sec. | YELLOW<br>LIGHT BROWN | FAINT CHOCOLATE<br>FAINT CHOCOLATE |
| | 50 | 5.4 g | 20 sec.<br>40 sec. | LIGHT BROWN<br>BROWN | CHOCOLATE<br>CHOCOLATE |
| | 51 | 4.5 g | 20 sec.<br>40 sec. | BROWN<br>DARK BROWN | CHOCOLATE<br>DARK COCOA |
| | 52 | 5.4 g | 20 sec.<br>40 sec.<br>60 sec. | LIGHT YELLOW<br>LIGHT BROWN<br>NO CHANGE | NONE<br>FAINT CHOCOLATE |
| | 53 | 5.4 g | 20 sec.<br>40 sec.<br>60 sec. | BROWN YELLOW<br>BROWN<br>DARK BROWN | NONE<br>CHOCOLATE<br>DARK CHOCOLATE |
| | 54 | 5.4 g | 20 sec.<br>40 sec.<br>60 sec. | NONE<br>TAN<br>LIGHT BROWN | NONE<br>FAINT CHOCOLATE<br>MILK CHOCOLATE |

A comparison of Experiments 1-33, 34-40, 41-47 and 48-54 shows that it is critical that:
(a) the solvent used be either:
 a mixture of ethanol and glycerine; or
 a mixture of propylene glycol and glycerine as opposed to ethanol alone; and
(b) the sugar reactant used must be ribose, rhamnose or cerelose (as opposed to fructose or glucose) (see Experiments 29 and 33).

EXAMPLE VII

Preparation of a Cocoa Beverage

In a 2 liter reaction vessesl equipped with stirrer, thermometer, heating mantle, reflux condenser and addition funnel is placed the following ingredients:

| Ingredients | Parts by Weight |
|---|---|
| Phenyalanine | 50.0 grams |
| Leucine | 40.0 grams |
| Ethyl alcohol | 160.0 grams |
| Glycerine | 750.0 grams |
| Sodium bicarbonate | 54.0 grams |
| Rhamnose | 55.0 grams |

The reaction mass is stirred at 40° C. for a period of one hour until most of the ingredients are dissolved. The resulting reaction mass is placed into a vessel which is placed in an industrial microwave oven. The reaction mass with stirring is microwaved until brown (total time 30 seconds).

The microwave radiation source is an Industrial Amana microwave oven (trademark of the Amana Corporation).

The resulting product is used in the production of a chocolate flavored beverage and a chocolate pudding as follows:

EXAMPLE VII(A)

Preparation of Cocoa Beverage

In a sauce pan, one cup of cocoa is blended with one cup of granulated sugar, three quarters teaspoon of salt ahd 1.5 quarts of water. With stirring the resulting product is boiled for a period of 10 minutes. At the end of the 10 minute period, 10 grams of the above flavor material is added to the cocoa mixture. Meanwhile, milk (4 quarts) is scalded in a double boiler. The resulting milk product is stirred into the cocoa mixture. The cocoa mixture is permitted to remain at low heat for 0.5 hours. One tablespoon of vanilla extract is admixed with 40 grams of the above microwaved flavor. The resulting mixture is added to the beverage with stirring. The resulting product has a natural, intense cocoa flavor having a quality on a scale of 1-10 of 9 and an intensity on a scale of 1-10 of 9 compared to the beverage without the microwaved flavor of my invention which has a quality on a scale of 1-10 of 6 and an intensity on a scale of 1-10 of 5 (as judged by five members of an "expert" panel).

EXAMPLE VII(B)

Preparation of a Chocolate-Cream Bread 7.5 Cups of milk is heated with 6 squares of unsweetened natural chocolate and one teaspoon of salt over low heat until the chocolate is melted; and then blended in a blender at 85 rpm for a period of 8 minutes.

Four whole eggs and two egg yolks are stirred for a period of 5 minutes at 70 rpm; and 1.5 cups of sucrose is added to the blend and the blending is continued at the same rate for a period of 5 minutes. The melted chocolate mixture is then blended in with the resulting product at 85 rpm.

40 Grams of the above-microwaved flavor is added to the resulting blend.

The resulting chocolate mixture is placed in a 3 quart cassarole and is baked for one hour.

Two egg whites are beatened until foamy and then 0.25 cups of sugar is gradually added until it is blended in at 150 rpm.

The resulting product is blended into the resulting chocolate mix for a period of 5 minutes and then baked for a period of 10 minutes at 400° F.

The resulting product is chilled to 30° F for a period of two hours.

The resulting pudding has an intense, natural chocolate aroma and taste and relatively high intensity; the quality and intensity on a scale of 1-10 being judged to be "9". The same chocolate pudding without the above-mentioned microwave flavor has a quality on a scale of 1-10 of 7 and an intensity on a scale of 1-10 (with respect to the chocolate flavor) of 4 (as judged by a 5 member expert panel).

What is claimed is:

1. A process for forming a chocolate flavor comprising the steps of:
   (a) providing a mixture of precursors of a chocolate flavor reaction product having a pH of from about 9 up to about 13 consisting essentially of phenyl alanine, leucine, a sugar selected from the group consisting of rhamnose, ribose and cerelose and a solvent which is capable of raising the dielectric constant of the mixture selected from the group consisting of glycerine, propylene glycol, mixtures of glycerine and propylene glycol, mixtures of glycerine and ethanol, and mixtures of propylene glycol and ethanol;
   (b) exposing the resulting mixture to microwave radiation for a period of time sufficient to cause a chocolate flavor profile to exist and to contain a perceptible quantity of the compound having the structure:

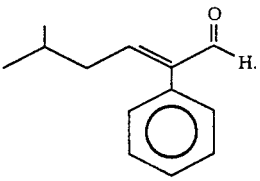

2. A process for providing a cooked, baked goods foodstuff having an intense chocolate flavor and containing a substantial quantity of the compound having the structure:

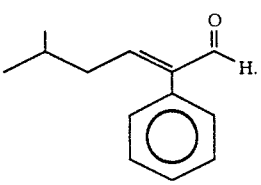

comprising the steps of:
   (a) providing the chocolate flavor of claim 1;
   (b) providing an uncooked, baked goods composition;
   (c) causing the mixture of (b) to be in intimate contact with said uncooked baked goods composition provided in (b);
   (d) exposing the thus treated, uncooked foodstuff to heat for a period of time sufficient to cause a chocolate flavor profile to be imparted to the foodstuff.

3. The product produced according to the process of claim 1.

4. The product produced according to the process of claim 2.

5. A beverage comprising a beverage base and intimately admixed therewith the product of claim 3.

* * * * *